United States Patent [19]
Osawa

[11] Patent Number: 5,498,864
[45] Date of Patent: Mar. 12, 1996

[54] CAMERA FOCUS DETECTION APPARATUS DETECTING FOCUS CONDITIONS AMONG MULTIPLE AREAS WITHIN A PHOTOGRAPHIC SCENE

[75] Inventor: Keiji Osawa, Tokyo, Japan

[73] Assignee: Nikon Corporation, Tokyo, Japan

[21] Appl. No.: 469,774

[22] Filed: Jun. 6, 1995

Related U.S. Application Data

[63] Continuation of Ser. No. 166,628, Dec. 15, 1993, abandoned.

[30] Foreign Application Priority Data

Dec. 15, 1992 [JP] Japan ..................................... 4-334197
Dec. 10, 1993 [JP] Japan ..................................... 5-310480

[51] Int. Cl.$^6$ .............................. G01J 1/20; G03B 13/18
[52] U.S. Cl. ........................................ 250/201.8; 354/408
[58] Field of Search ......................... 250/201.8; 354/402, 354/404, 406, 408

[56] References Cited

U.S. PATENT DOCUMENTS

| | | | |
|---|---|---|---|
| 4,992,818 | 2/1991 | Karasaki et al. ...................... | 250/201.8 |
| 5,049,731 | 9/1991 | Ishida et al. ............................. | 354/408 |
| 5,086,217 | 2/1992 | Ishida et al. .......................... | 250/201.8 |
| 5,138,359 | 8/1992 | Nagano et al. ......................... | 354/406 |
| 5,233,173 | 8/1993 | Moriyama .............................. | 354/406 |
| 5,321,248 | 6/1994 | Sensui .................................. | 250/201.8 |

*Primary Examiner*—Stephone B. Allen

[57] ABSTRACT

A focus detection apparatus that detects focusing conditions among multiple viewing areas within an image plane of a camera in order to guarantee equal focusing precision among the multiple viewing areas. The focus detection apparatus includes an aperture mask, a secondary imaging lens, and a line sensor which are assembled as a sub-unit. Each area of a multitude of viewing areas is provided with such a sub-unit to perform cross-eye adjustments. Finally, each sub-unit is aligned for installation on a main unit that is equipped with a field lens in order to perform pupil exit adjustments independently for each of the aforementioned viewing areas.

6 Claims, 11 Drawing Sheets

CAMERA FOCUS DETECTION APPARATUS DETECTING FOCUS CONDITIONS AMONG MULTIPLE AREAS WITHIN A PHOTOGRAPHIC SCENE

RELATED CASE INFORMATION

This application is a continuation of U.S. patent application Ser. No. 08/166,628 filed Dec. 15, 1993 (now abandoned).

BACKGROUND OF THE INVENTION

1. Field of the Invention

The present invention relates to focus adjustment mechanisms of phase difference type focus detection apparatuses that are particularly suitable for use in single-lens reflex ("SLR") cameras and the like.

2. Description of the Related Art

A phase difference type focus detection block integrated into a single-lens reflex camera is known and an example is explained with reference to FIG. 1.

In FIG. 1, between a taking lens 1 and a film surface 31, a quick return mirror 20 having a semi-transparent area is centrally located. Luminous flux taken in from taking lens 1 is reflected upward at quick return mirror 20 which, in turn, is directed towards a finder system. The finder system is comprised of a focusing screen 22, a condenser lens 23, a pentagonal prism 24, and an eyepiece 25. The optical and reflective qualities of the finder system will be apparent to those skilled in the art. On the other hand, luminous flux taken in from taking lens 1 which penetrates through the semi-transparent area of quick return mirror 20 is reflected at a sub-mirror 21 and is directed towards a phase difference type focus detection block 11. Field mask 2, field lens 3, aperture mask 4, reimaging lenses 5a1 and 5a2, line sensor 6, and reflecting mirror 7 are fixed in integrated unit 10 to make up the focus detection block 11.

To obtain accurate subject distance, the following two adjustments are made in phase difference type focus detection block 11. The two adjustments refer to: (1) adjustment of the optical axis of the focus detection block and that of the camera body (hereinafter referred to as "pupil exit adjustment"), and (2) rotational alignment around an optical axis for the reimaging lens and a pair of line sensors that receive an image (hereinafter referred to as "squint adjustment").

Focus detection block 11 is mounted onto a camera body using three screws and springs to prevent diversion by changing the entire angle of focus detection block 11 through an adjustment of the screws. Alternatively, as described in Japanese Patent Publication No. 62-161111, it is also possible to make a pupil exit adjustment by moving field lens 3 on the plane area that is perpendicular to the luminous axis of field lens 3.

Configuration of a typical phase difference type focus detection optical system is shown in FIG. 2. Field mask 2 restricts unnecessary light outside of the focus detection field, while field lens 3 conjugates a pair of openings 4a and 4b of mask 4 and the exit pupil of taking lens 1. Moreover, a pair of reimaging lenses 5a1 and 5a2 reimages on line sensor 6 the luminous flux that penetrates separate areas of the exit pupil of taking lens 1. Correlation for locations of two images that have been reimaged are obtained from the output of two photoreceptors 6a1 and 6a2 of line sensor 6 to thereby allow focus discrepancy to be calculated.

In FIG. 2, the pupil exit adjustment refers to the alignment of an optical axis that is determined in the area from field mask 2 to reimaging lenses 5a1 and 5a2 (i.e. the optical axis of a focus detection block) with the optical axis of taking lens 1 on the camera side. If this alignment is inadequate, openings 4a and 4b of aperture mask 4 are not projected to the proper location on the exit pupil of taking lens 1, and the luminous flux, that otherwise should enter reimaging lenses 5a1 and 5a2, is diverted at the exit pupil of taking lens 1, thereby affecting the precision of the focus detection procedure.

Squint adjustment refers to the rotational alignment of reimaging lenses 5a1 and 5a2 and line sensor 6 around an optical axis. If this alignment is inadequate, for example, if line sensor 6 is tilted away from the proper position of the plane area that is perpendicular to the luminous axis, photoreceptors 6a1 and 6a2 become tilted as shown in FIG. 10A, resulting in a vertical shift, thus detecting the focus points for subject images at different locations. Furthermore, if the plane areas of reimaging lenses 5a1 and 5a2 are tilted perpendicular to the luminous axis, projected images 30a1 and 30a2 are projected onto different locations; therefore, focus points for different locations of the subject images are detected as shown in FIG. 10B even if line sensor 6 is not tilted. Consequently, if a cross-eye adjustment is insufficient, photoreceptors 6a1 and 6a2 perform the photometric process for different locations of the subject images, and accurate focus detection can not be achieved with prior known devices of the type just described.

If line sensor 6 is rotated from the state shown in FIG. 10A so that the rotational positions thereof match with reimaging lenses 5a1 and 5a2 around the optical axis, this results in a state shown in FIG. 11A. If line sensor 6 is rotated from the state shown in FIG. 10B so that the rotational positions thereof match with reimaging lenses 5a1 and 5a2 around the optical axis, the resulting state is depicted in FIG. 11B. In both of the aforementioned cases, photoreceptors 6a1 and 6a2 perform photometry for the same location of a subject image. In FIG. 1, line sensor 6 is mounted on unit 10 by aligning it with reimaging lenses 5a1 and 5a2 around the optical axis.

In contrast to the structure for a focus detection apparatus for a camera shown in FIG. 1, a focus detection apparatus of a camera that is capable of providing detection focuses for multiple areas in an image plane is suggested in Japanese Patent Publication No. 63-11906. FIG. 3 depicts an example of such an apparatus wherein three focus points are detected. The basic configuration of the optical system of FIG. 3 is substantially the same as the structure depicted in FIG. 1.

Referring now to FIG. 3, field mask 12 comprises three openings 12a, 12b, and 12c. Opening 12a of the field mask is horizontal, whereas openings 12b and 12c are vertical. Field lens 13 comprises three lens parts 13a, 13b, and 13c. Additionally, aperture mask 14 comprises a pair of three aperture openings (indicated by dotted lines).

Reimaging lens 15 comprises three pairs of imaging lenses (15a1, 15a2), (15b1, 15b2), and (15c1, 15c2), and line sensor 16 has three pairs of photoreceptors (16a1, 16a2), (16b1, 16b2), and (16c1, 16c2). The combinations of lenses and photoreceptors correspond to three focus areas. Field mask 12, field lenses 13a, 13b, and 13c, aperture masks 14a, 14b, and 14c, reimaging lenses 15a, 15b, and 15c, and line sensors 16a, 16b, and 16c constitute an independent optical system that detects a focus point for each area. In this case, focus detection block 90 is secured to the camera body or the like (not shown) wherein field mask 12, field lens 13b, aperture mask 14, reimaging lens 15, line sensor 16, and mirror 7 are integrated as a unit.

The above-illustrated structure depicted in FIG. 3 is such that if focus detection block 90 is mounted on a camera body using screws and springs, thereby changing the entire angle of focus detection block 90 with an adjustment of the screws to perform a pupil exit adjustment for one of the areas, the other two areas cannot be adjusted. As described in Japanese Patent Publication No. 62-161111, if the field lens 13 is moved so that its plane area is perpendicular to its optical access for a particular area, such an arrangement provide the same results as noted above. Additionally, when the rotational locations of the photoreceptors/photosensors of line sensor 16 and reimaging lens 15 are aligned for a squint adjustment for one area, the other two areas cannot be adjusted.

The present invention solves the aforementioned problems. More particularly, the present invention provides a focus detection apparatus wherein pupil exit and squint adjustments may be independently achieved for multiple focus detection areas with great accuracy and minimal space requirements.

SUMMARY OF THE INVENTION

It is therefore an object of the present invention to solve the above-mentioned problems associated with optical systems used to provide focusing among multiple areas of an imaging plane.

It is yet another object of the present invention to solve the problems associated with performing pupil exit adjustments of known optical systems having multi-focus points.

It is still another object of the present invention to solve the problems associated with performing squint adjustments of known optical systems having multi-focus points.

It is still a further object of the present invention to provide a focus detection apparatus wherein all pupil exit and squint adjustments are achieved for multiple focus detection areas of an image plane with great accuracy among all focus areas.

It is still a further object of the present invention to provide a focus detection apparatus wherein all pupil exit and squint adjustments are done for multiple focus detection areas of an image plane while requiring only minimal space requirements for inclusion in a camera.

It is yet another object of the present invention to provide a multi-focus system that is cost-effective to manufacture and that can be produced at effective price points to thereby result in great market appeal.

These and other objects are achieved by the present invention by providing a focus detection apparatus for detecting focus points for at least two areas of a field of view. The apparatus is adapted to be used with a camera having a lens for taking in light. The focus detection apparatus includes at least two field lenses positioned near an imaging plane for generating an image formed from light taken in by the lens and being used to condense the luminous flux corresponding to two or more areas of a field of view. Also, the apparatus includes at least two pairs of reimaging lenses for separately receiving the light coming through the field lenses in such a manner that the luminous flux corresponding to two or more areas of a field of view forms at least two subject images for each area. Additionally, the apparatus includes at least two pairs of aperture masks that are positioned near each pair of reimaging lenses to regulate the light coming through each pair of reimaging lenses. At least two pairs of photoreceptors are positioned near a secondary imaging plane for generating upon the secondary imaging plane an image formed from light coming through each pair of reimaging lenses.

The present invention will be described in detail below.

BRIEF DESCRIPTION OF THE DRAWINGS

The above-mentioned and other objects and advantages of the present invention will become apparent and more readily appreciated from the following description of the preferred embodiments, taken in conjunction with the accompanying drawings of which.

DETAILED DESCRIPTION OF THE PREFERRED EMBODIMENTS

Figure 1:
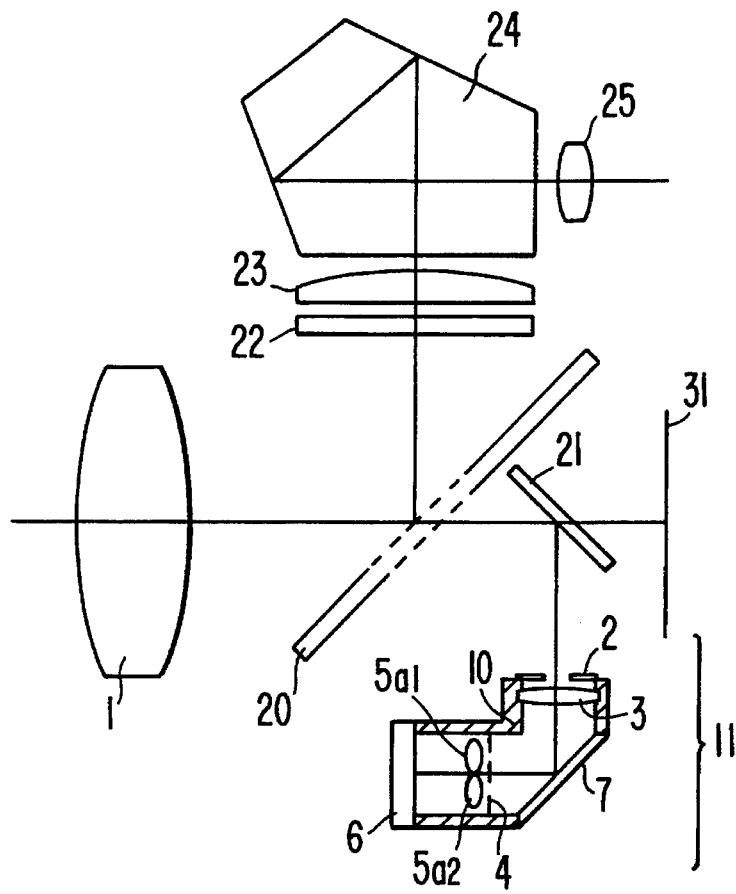
FIG. 1 is a schematic view depicting a basic configuration of an optical system of a prior art focus detection apparatus.
Figure 2:
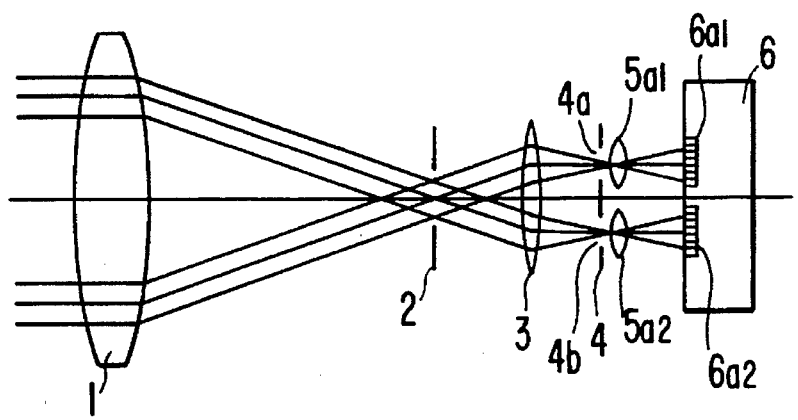
FIG. 2 is a schematic view depicting a basic configuration of a prior art focus detection apparatus of the phase difference type.
Figure 3:
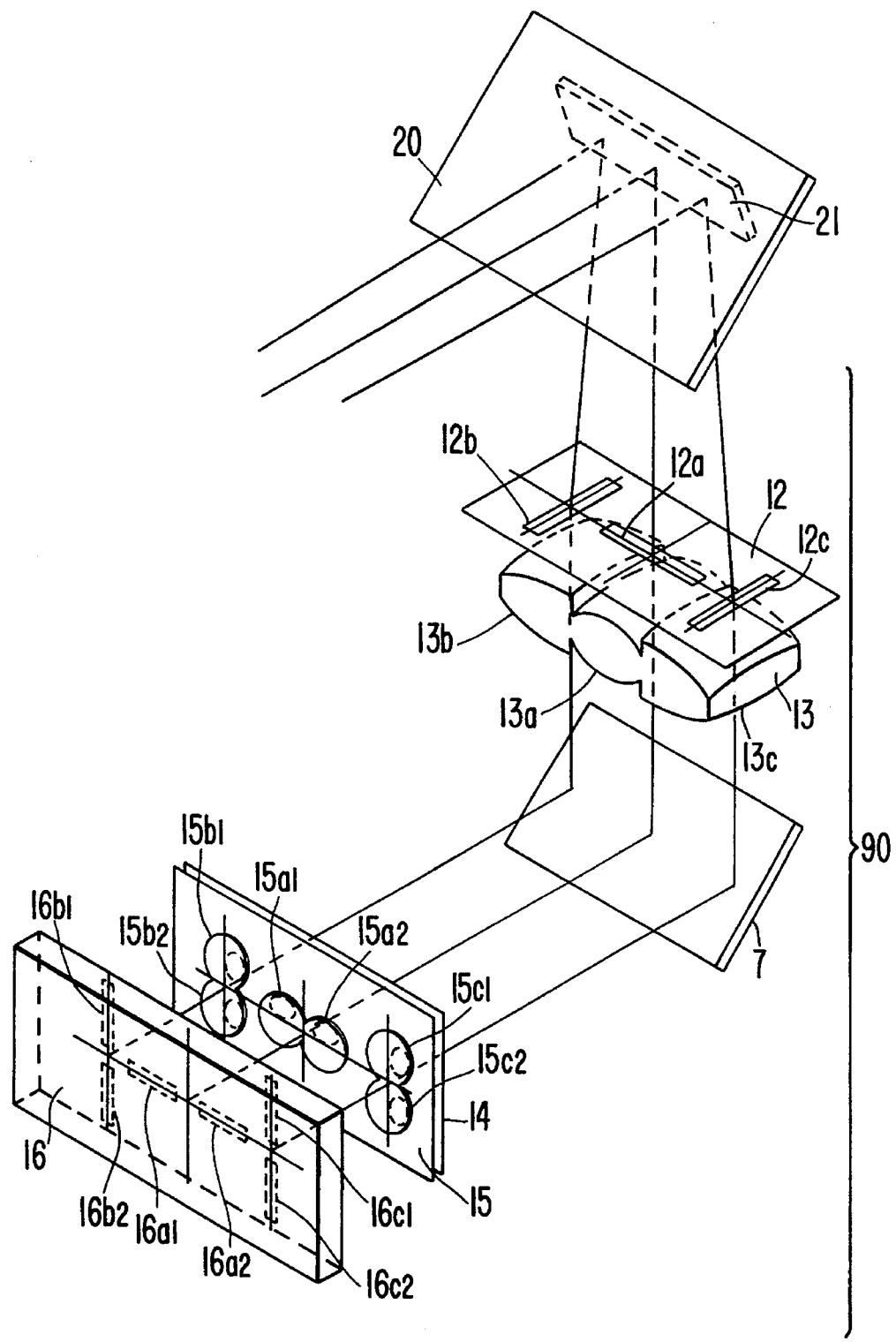
FIG. 3 is a schematic, perspective view of a configuration of a prior art focus detection apparatus that has multiple focus detection areas.

The present invention is described with reference to the drawings which were briefly described above and which are now referred to in order to provide a detailed description of the preferred embodiments. Where appropriate in the following discussions, like parts will be identified with like reference numerals.

A FIRST PREFERRED EMBODIMENT

Figure 4:
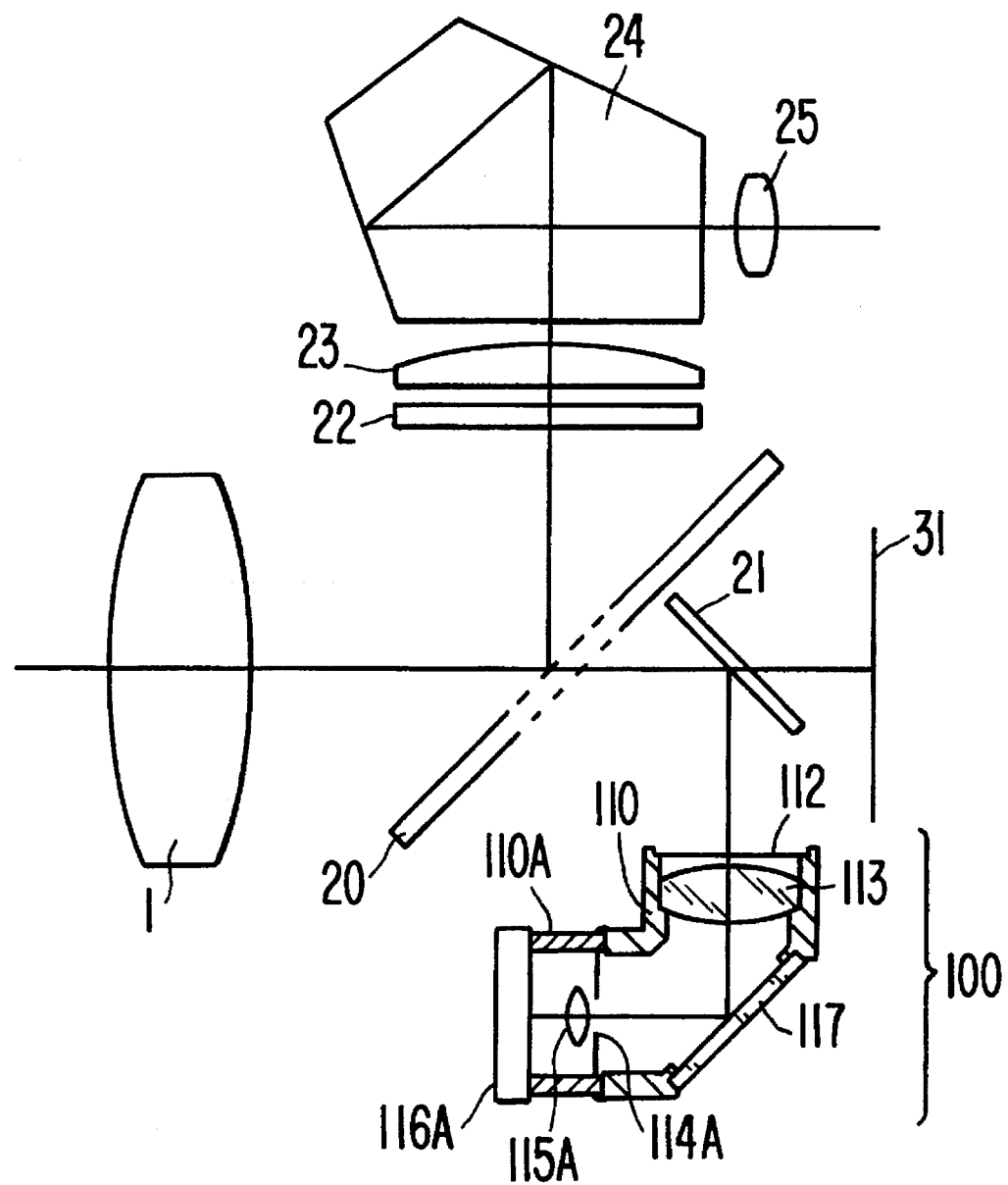
FIG. 4 is a schematic view of a basic structural configuration of the optical system of a focus detection apparatus according to a first embodiment of the present invention.

Referring now to FIG. 4, therein depicted is a basic structural configuration of an optical system of a focus detection apparatus according to a first embodiment of the present invention. More particularly, FIG. 4 depicts a central cross-sectional view of an optical system wherein a focus detection block 100 is used to detect the focus points of three areas. While the optical system depicted in FIG. 4 is arranged for use in a single-lens reflex (SLR) camera, it will be understood by those skilled in the art that the present invention is not so limited. In fact, the teachings of the present invention may be applied to numerous other types of optical systems, including but not limited to, video cameras, microscopes, etc.. As the central area of FIG. 4 is in a profile view, openings on reimaging lens 115A and aperture mask 114A appear as one.

Figure 5:
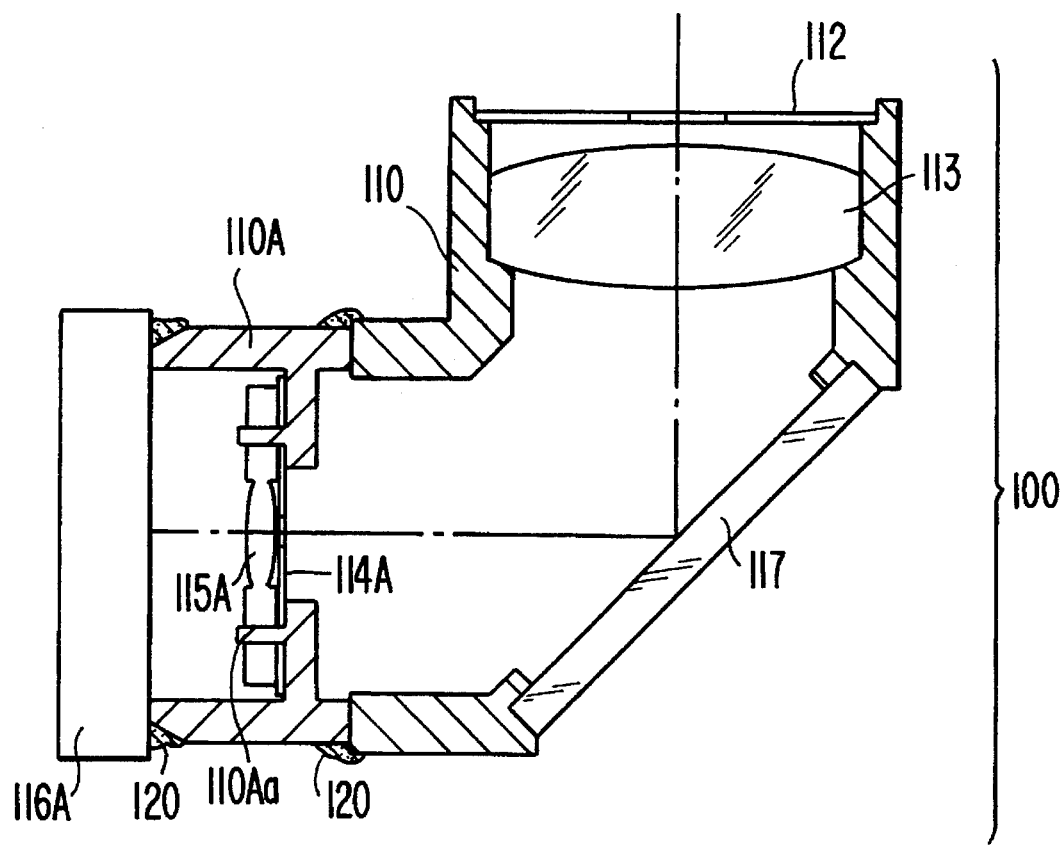
FIG. 5 is a cross-sectional view of a focus detection block which forms part of the optical system depicted in FIG. 4.

Referring now to FIG. 5, therein depicted is a cross-sectional view of the focus detection block 100 which forms part of the optical system depicted in FIG. 4. Aperture mask 114A that forms an optical system corresponding to the focus detection area in a central location, reimaging lens 115A, and line sensor 116A are mounted in sub-unit 110A. The entirety of sub-unit 110A is configured as a separate assembly for manufacturing purposes, but also may be made as an integral part of an optical system incorporating the teachings of the present invention. This assembly is mounted to a main unit 110 with adhesive 120. While adhesives, such as glues and the like may be used, other well-known and well-suited fastening devices may be used including, but not limited to, screws, screws with springs, etc..

Main unit 110 includes a field mask 112, a field lens 113 and a mirror 117.

Figure 6:
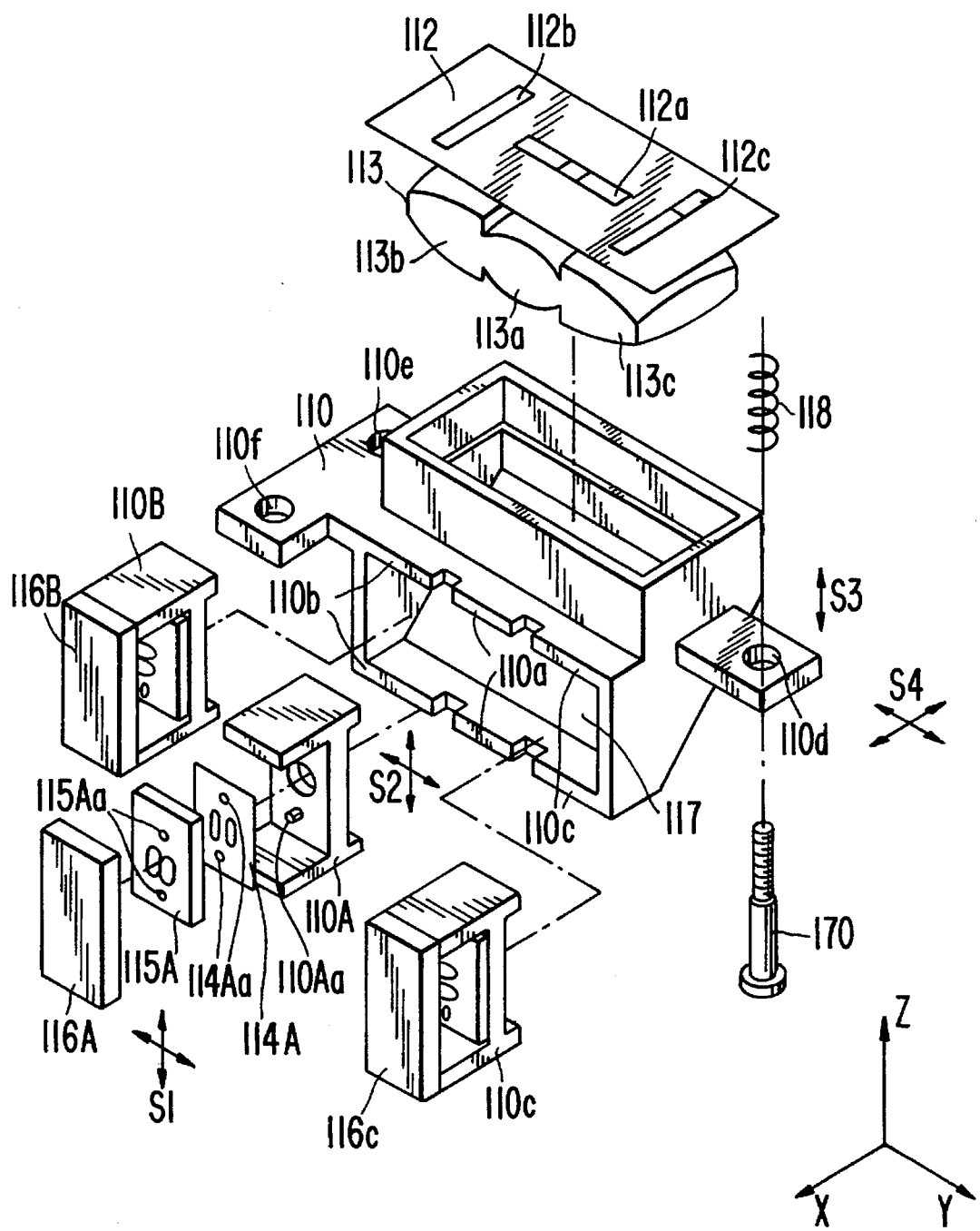
FIG. 6 is an exploded view of view of the focus detection block depicted in FIG. 4.

Referring now to FIG. 6, therein depicted is an exploded view of the focus detection block depicted in FIG. 5. In this embodiment, there are a total of three focus detection areas which are referred to herein as the left, center, and right focus detection areas. While the present embodiment incorporates three focus detection areas, the present invention should not be so limited, but instead, it should be well understood that at least two focus detection areas may be configured. In the present embodiment, field mask 112 has three openings, 112a, 112b, and 112c, corresponding to the three focus detection areas. Opening 112a is arranged horizontally in relation to openings 112b and 112c. Opening 112a is centrally located relative to openings 112b and 112c which are positioned vertically next to central opening 112a. Field lens 113 actually has three lenses 113a, 113b, and 113c. Mirror 117 reflects all luminous flux from three focus detection areas of three sub-units 110A, 110B, and 110C.

Pins 110Aa, 110Ba, and 110Ca (only 110Aa is shown in FIG. 6) are installed on sub-units 110A, 110A, and 110C, respectively. Holes 114Aa, 114Ba, and 114Ca (only 114Aa is shown in FIG. 6) are made in aperture masks 114A, 114B, and 114C (only 114A is shown in FIG. 6), while holes 115Aa, 115Ba, and 115Ca (only 115Aa is shown in FIG. 6) are made in reimaging lenses 115A, 115B, and 115C (only 115A is shown in FIG. 6).

The line sensor 116 is also divided into line sensors 116A (central), 116B (left) and 116C (right) which correspond to the three focus detection areas. Line sensors 116A, 116B, and 116C are mounted with adhesives 120 as mentioned above after adjustment.

In this embodiment, aperture mask 114A, reimaging lens 115A and line sensor 116A are configured so that a horizontal character such as "–" for example may be detected. Moreover, any other character such as "+" for example may be detected. Additionally, line sensors 116A, 116B, and 116C may be configured to detect any other graphic, non-graphic, alpha, or numeric character.

What follows are discussions of the assembly and adjustment procedures necessary for proper operation of the focus detection of the present embodiment.

ASSEMBLY OF THE MAIN UNIT AND SUB-UNITS

In terms of assembly, first, reflection mirror 117, field lens 113, and field mask 112 are mounted with adhesives 120 on main unit 110 in the aforementioned order. The present invention provides the advantage that when mounting the aforementioned structural elements, special adjustments for positioning are not required.

Next, the assembly procedure is explained by referring to sub-unit 110A (i.e. corresponding to the central area which is one of the sub-units which, in turn, corresponds to a focus detection area). Aperture mask 114A and reimaging lens 115A are placed over sub-unit 110A and mounted with adhesives or other fastening devices. The location of aperture mask 114A and reimaging lens 115A are determined by fitting of two bosses 110Aa (the other is not shown) that are embossed or are made to protrude from sub-unit 110A, and holes 114Aa, 115Aa that are created on aperture mask 114A and reimaging lens 115A.

SQUINT ADJUSTMENT

Line sensor 116A is mounted on sub-unit 110A in order to perform squint adjustments. Sub-unit 110A, which is comprised of aperture mask 114A and reimaging lens 115A as described above, is mounted on a first adjustment standard jig. The first adjustment standard jig includes the field lens, field mask, mirror box, and the taking lens for use with the jig. For the first adjustment jig, the object that corresponds to reflection mirror 117 is not mandatory as long as the optical length is the same.

Then, in order to position the projected image of the field mask for jig use by reimaging lens 115A and the photoreceptor of line sensor 116A, line sensor 116A is moved within the plane area indicated by S1 in FIG. 6 and is fastened with adhesives 120 at the appropriate location. The same procedure is followed for other sub-units, such as units 110B and 110C. Thus, squint adjustments can be accomplished for sub-units 110A, 110B, and 110C in similar fashion.

PUPIL EXIT ADJUSTMENT

Sub-unit 110A, which has been assembled to the point of line sensor 116A, is removed from the first adjustment jig to install on main unit 110 wherein reflection mirror 117, field lens 113, and field mask 112 have been integrated as discussed above. At this time, pupil exit adjustment may be achieved by calculating the position of sub-unit 110A.

First, main unit 110 is installed (not shown). Second, the adjustment jig wherein both the mirror box for jig use and the taking lens for jig use are mounted (the positioning and mounting units of the mirror box and the taking lens may be the same as those used on the first adjustment jig). Next, sub-unit 110A is placed against mounting surface 110a of main unit 110, and sub-unit 110A is moved within the plane area indicated by S2 in FIG. 6, which is perpendicular to the optical axis, in order to perform pupil exit adjustment. By moving sub-unit 110A within the plane area indicated by S2, the relative locations of aperture mask 114A, mounted on sub-unit 110A, and field lens 113 mounted on main unit 110, are moved. Consequently, the same effect as that produced with moving field lenses within the plane area which is perpendicular to the optical axis is obtained, thereby enabling the opening of aperture mask 114A to accurately project, by field lens 113, within the exit pupil of the taking lens for jig use. Sub-unit 110A, properly positioned, is mounted on main unit 110 with adhesives 120 or the like.

The adjustments just described may be followed using the same procedures separately and independently for other sub-units 110B and 110C (i.e. corresponding to other focus detection areas). As it is possible to perform pupil exit adjustment independently for each area, focus detection precision can be accurately achieved for the three areas. While three areas are described in the context of the present embodiment, the present invention can be applied for fewer or more than three viewing areas.

The immediately preceding description was directed to the adjustment of a single focus detection unit. What follows is a description of further implementation regarding the first embodiment of the present invention.

Figure 7:
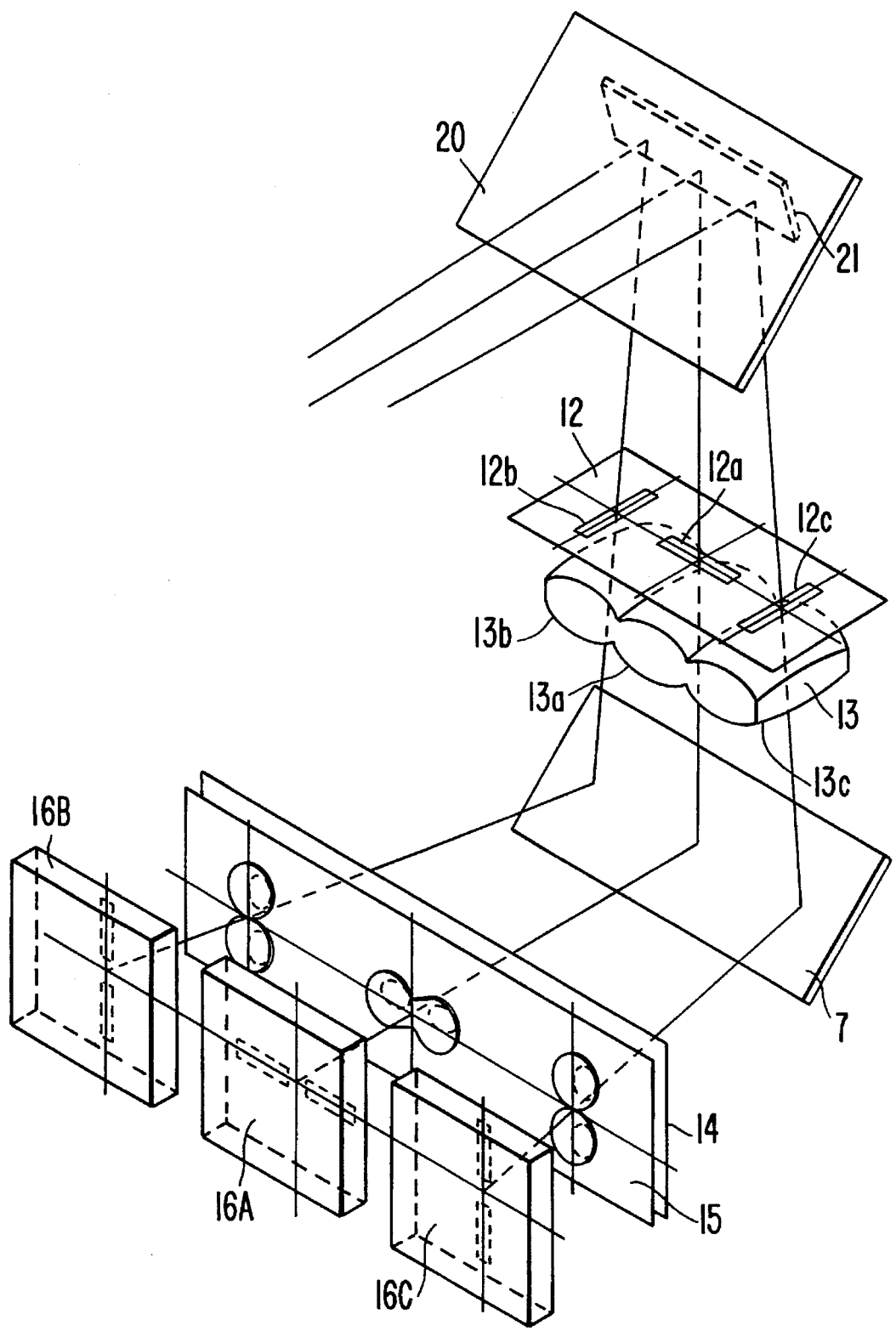
FIG. 7 is a schematic, perspective view of a focus detection block having a line sensor comprising three parts.

First, if the line sensor is divided into packages 16A, 16B, 16C for each area as shown in FIG. 7, the squint adjustment for each area may be performed independently. However, a problem develops in that, if field mask 12 to line sensors 16A, 16B, and 16C are configured as an integrated unit, pupil exit adjustment can be performed only for a single area. More specifically, as the pupil exit adjustment is done by changing the angle of the entire focus detection block, the angle of a sub-unit cannot be changed after pupil exit adjustment for any other area, therefore, accurate pupil exit adjustment cannot be performed for other areas.

Second, if a line sensor is divided for each area and a field lens is divided into lenses corresponding to each area, pupil exit adjustment and squint adjustment for all areas are possible by movement of a field lens within the plane area which is perpendicular to the optical axis as described in Japanese Patent Publication No. 62-161111. However, a sub-unit can become very large as adequate space is required around all lenses for dividing a field lens and providing movement of a field lens. Additionally, as distances between each divided field lens are determined by how the focus detection areas are positioned, in some instances, depending upon area positioning, the space may not be properly maintained for adjustments by movement of a field lens. Additionally, as the field lens must be positioned near the primary image plane that is conjugated with a film surface, location thereof is inevitably near the bottom of the mirror box. Therefore, it is difficult to place an adjustment mechanism for multiple lenses and marginal adjustment space.

In light of the foregoing, mounting of components of the optical system of the present invention for each area, from aperture mask 114 through line sensor 116 on sub-unit 110 A–C to enable a squint adjustment within a sub-unit and a pupil exit adjustment for each area between sub-units 110A, 110B, and 110C and main unit 110 as described in this embodiment, allows space saving results while providing marginal adjustment space.

INTEGRATION OF THE MAIN UNIT INTO A CAMERA BODY

After the main unit is adjusted according to the present invention as described, main unit 110 is removed from the second adjustment jig to be integrated into the front body of a camera. Installation onto a camera is done, as shown in FIG. 6, by placing spring 118 between the arm part of adjusted main unit 110 and the front body of the camera, followed by inserting screw 170 through three holes, 110d, 110e, and 110f, on the arm part of the main unit 110.

When the X, Y, Z axes are set as shown in FIG. 6, holes 110d, 110e are positioned near the optical axis of field lens 113 in the X-axis and on both sides of adjusted main unit 110 in the Y-axis. Hole 110f is positioned at the same location as hole 110e in the Y-axis and is off-positioned towards line sensors 116A, 116B, and 116C in the X-axis direction.

As focus detection block 100 is pressed by spring 118, focus detection block 100 may be moved vertically as indicated by S3 (Z-axis) by rotating screw 170 in three places, or it may be adjusted by rotational alignment around the X and Y axes. Of these two, rotational alignment around the X and Y axes applies to pupil exit adjustments when integrating focus detection block 100. In focus detection block 100, as pupil exit adjustments have been completed among multiple areas, pupil exit adjustments for other areas will be simultaneously completed by performing pupil exit adjustments only for one of the areas during integration. Vertical adjustment of focus detection block 100 in the Z-axis (indicated by S3) is to match the locations of focus points for the front body of a camera and focus detection block 100. In this fashion, it is necessary to align focus detection block 100 by moving it within the plane indicated by S4 in order to match the focus detection location and the focus detection frame in a finder. However, this adjustment has no correlation with focus detection precision. Such is the case as long as the correlation between the location of screw holes 110d, 110e, and 110f of main unit 110 and the location of screw stop holes on the front body of a camera are manufactured with some mechanical precision which will be apparent to those skilled in the art. The focus detection location and the focus detection frame should be within an error range that does not cause practical problems.

A SECOND PREFERRED EMBODIMENT

Figure 8:
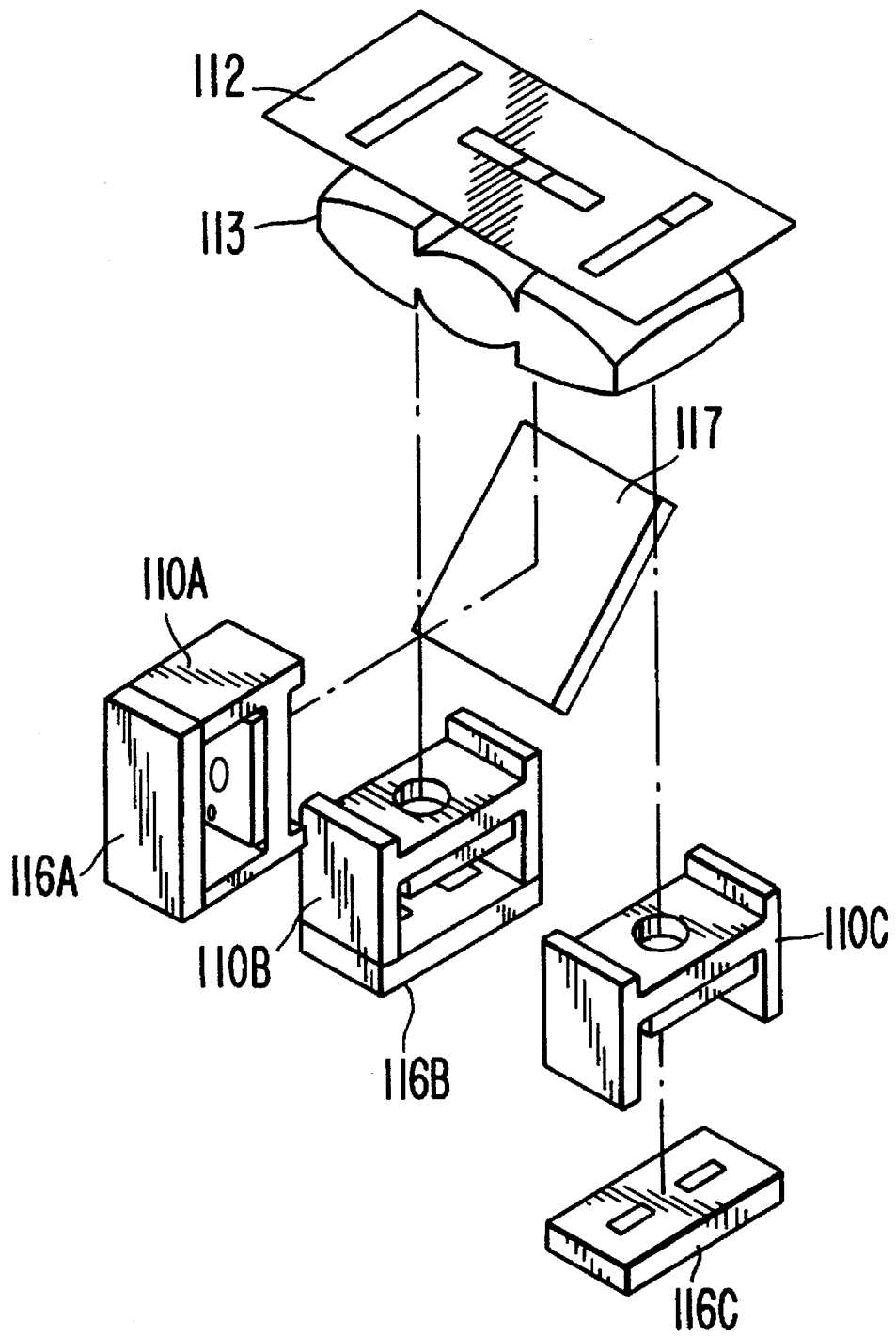
FIG. 8 is an exploded view of a focus detection block according to a second embodiment of the present invention.

Referring now to FIG. 8, therein depicted is a focus detection block according to a second embodiment of the present invention. The basic configuration of sub-units 110A, 110B, and 110C and the main unit (not shown) that comprises an assembly is similar to the structure for the first embodiment depicted in FIG. 6. The second embodiment differs from that depicted in FIG. 6, however, where reflecting mirror 117 is eliminated in the focus detection optical system for surrounding focus detection areas outside of the central image plane. Luminous flux that is reflected at a 90° angle by mirror 117 is directed towards line sensor 116A in the on-axis area of a taking lens. Luminous flux is directed towards line sensors 116B and 116C for the off-axis area without the use of reflecting mirror 117. Consequently, line sensors 116A are positioned parallel to the optical axis of field lens 113 while line sensors 116B and 116C are so positioned that they are perpendicular to the optical axis of field lens 113.

When line sensors 116A, 116B, and 116C are separately positioned as described above, the space around each sub-unit increases, thereby further facilitating squint and pupil exit adjustments. Additionally, as the three line sensors are not aligned side by side, it becomes possible to reduce the width of the main unit.

A THIRD PREFERRED EMBODIMENT

Figure 9:
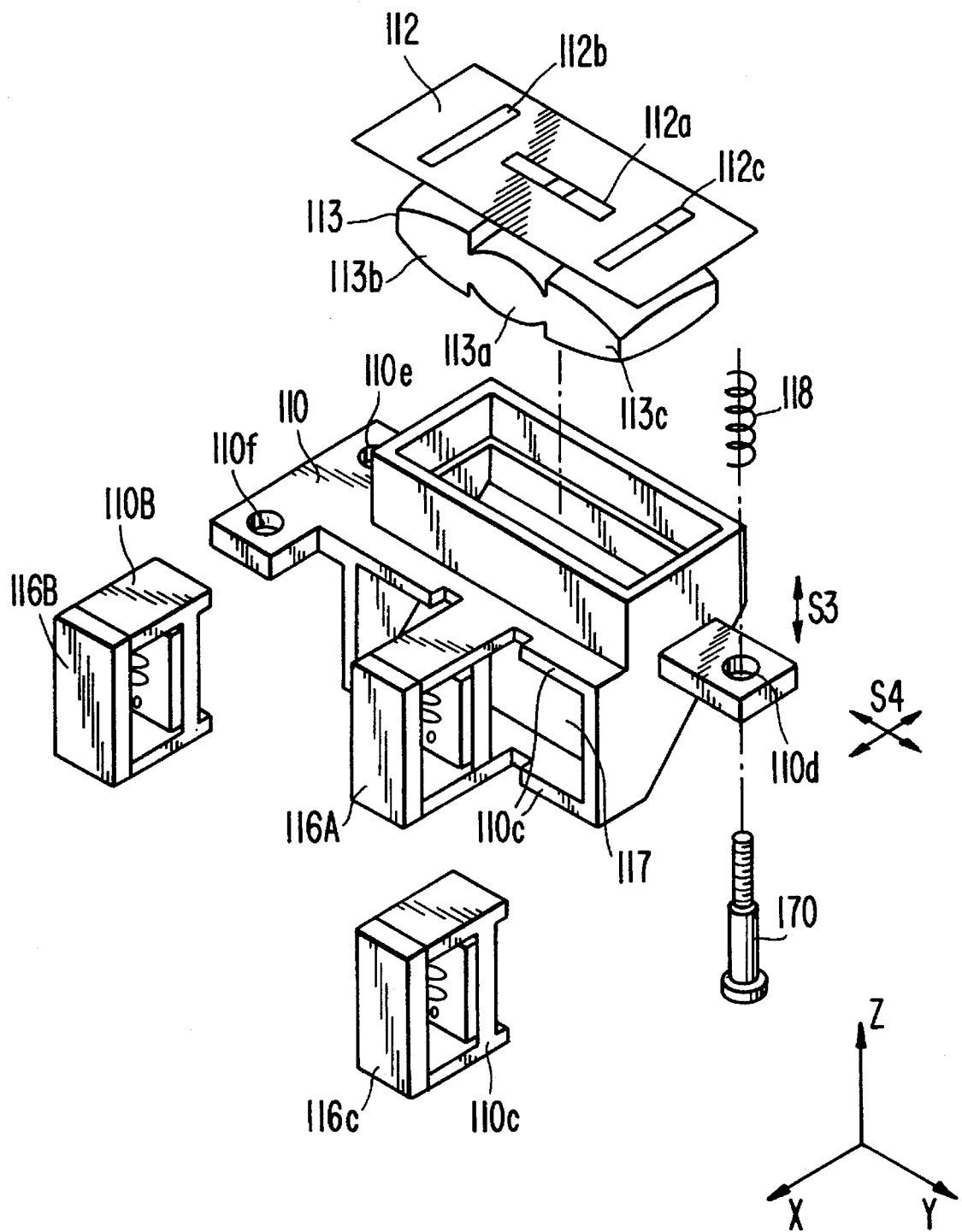
FIG. 9 is an exploded view of a focus detection block according to a third embodiment of the present invention.
Figure 10A:
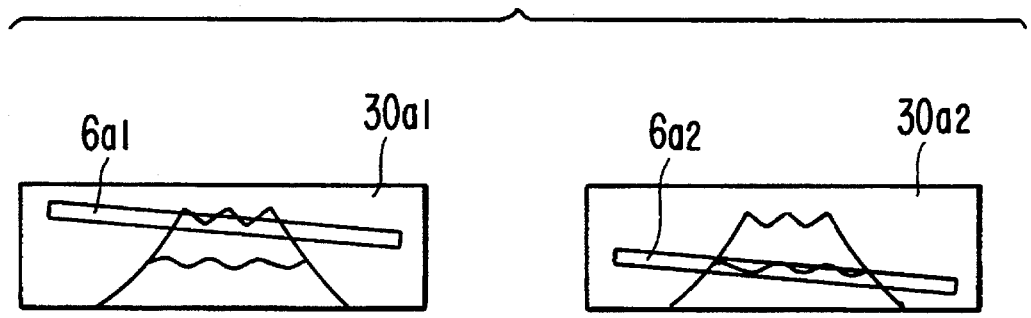
FIGS. 10A and 10B are views of a subject image which has been projected onto a line sensor.
Figure 10B:
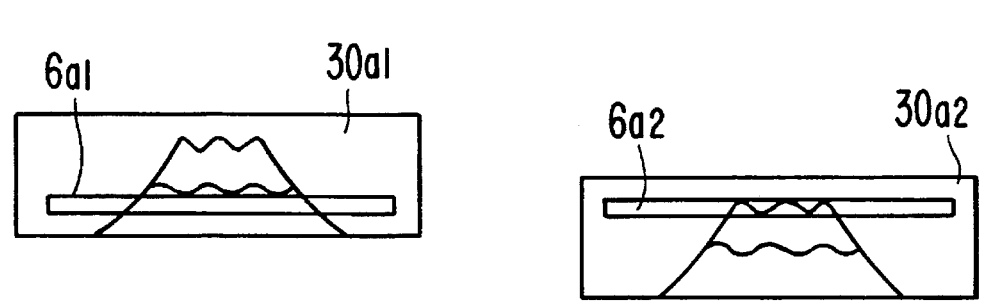
Figure 11A:
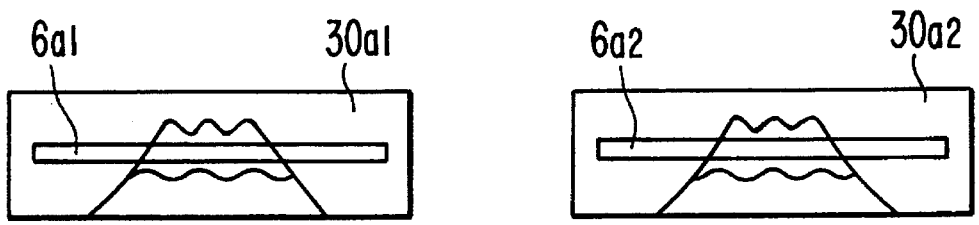
FIGS. 11A and 11B are views of a subject image projected onto a line sensor after having undergone squint adjustment.
Figure 11B:
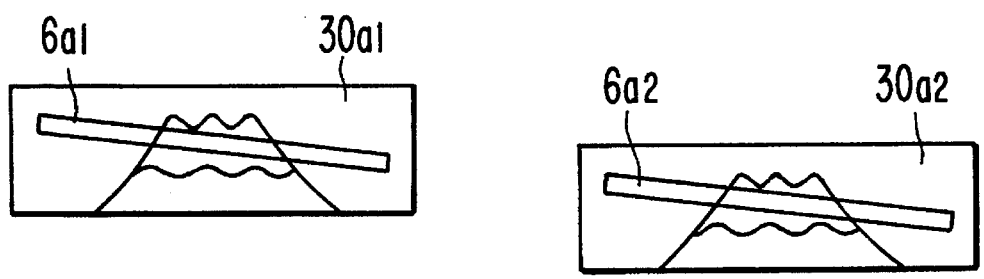

Referring now to FIG. 9, therein depicted is an exploded view of a focus detection block according to a third embodiment of the present invention. In the first and second embodiments, structure from the aperture mask to the line sensors are configured as a sub-unit separate from the main unit in all areas; whereas, in this third embodiment, one of the multiple component areas, for example, an optical system in the on-axis area, is integrated with the main unit. Adjustment is possible in this case as with the first and second embodiments discussed above.

For squint adjustment, line sensors 116A, 116B and 116C are aligned with unit 110, sub-units 110B and 110C, respectively, and fixed thereto with adhesives 120 and the like.

For pupil exit adjustment, the following procedure is performed. When performing the pupil exit adjustment after mounting the second adjustment jig, the angle of the entire main unit is changed first to make the pupil exit adjustment for the second adjustment jig in the on-axis area. Subsequently, pupil exit adjustment for other areas are achieved by determining the position of the sub-unit. Subsequent procedures are the same with that of the aforementioned adjusted main unit when integrating, thereof, into the front body of a camera.

A FOURTH PREFERRED EMBODIMENT

Figure 12:
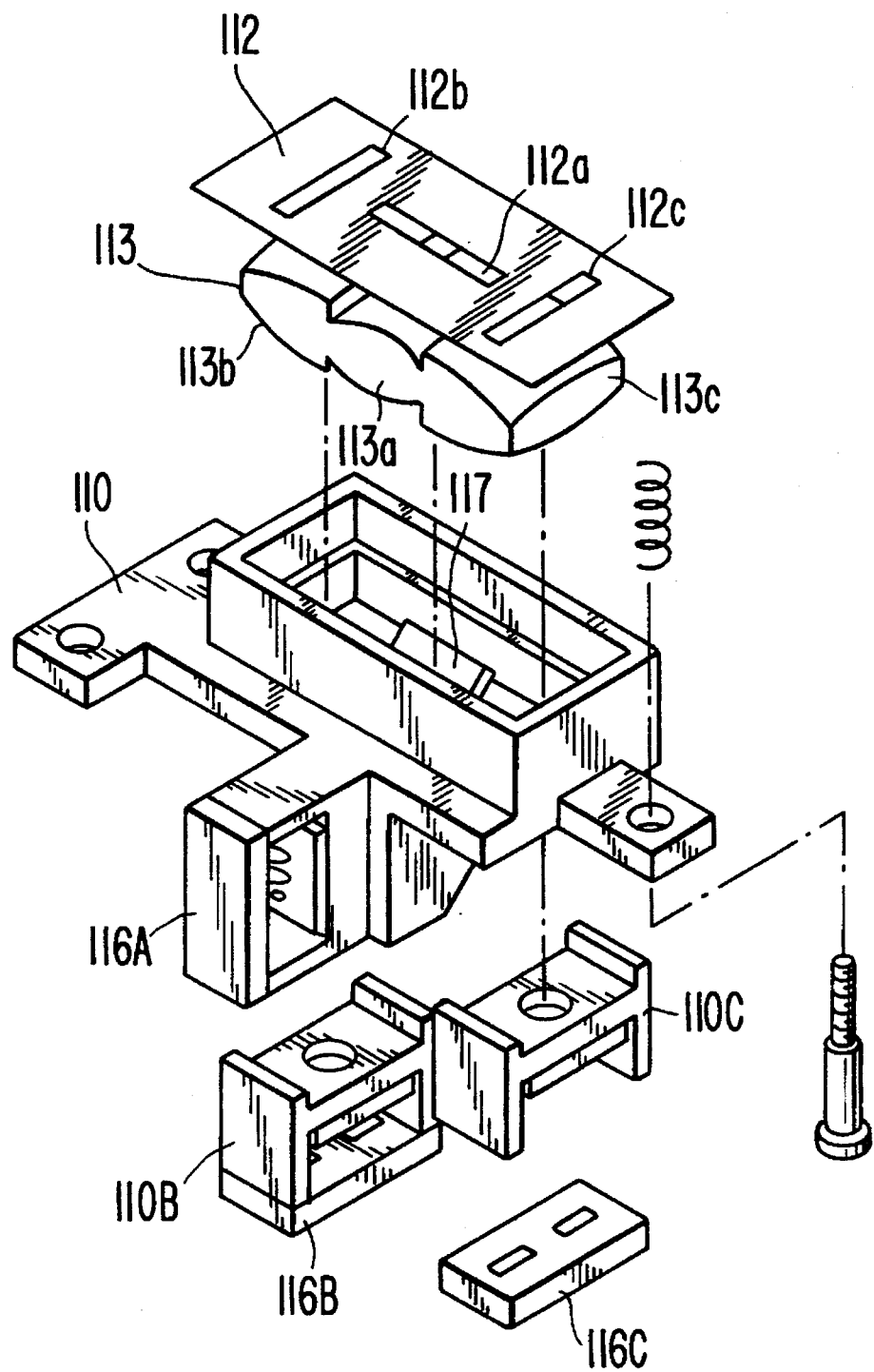
FIG. 12 is an exploded view of the focus detection block according to a fourth embodiment of the present invention.

Referring now to FIG. 12, therein depicted is an exploded view of a focus detection block according to a fourth embodiment of the present invention. In particular, this focus detection block is configured so that the one of the multiple component areas, as like the structure depicted in FIG. 9, is formed integral with the main unit.

Here, the optical system in the central image plane area is integral to the main unit 110. The other areas from the stop mask to the line sensor are configured as separate sub-units 110B and 110C. Light reflected by mirror 117 is guided to line sensor 116A corresponding to the center area. Moreover, light which is not reflected by mirror 117 is guided to line sensors 116B and 116C for use in the other areas. The aforementioned structure and operation are different from that described in regard to FIG. 8.

The structure depicted in FIG. 12 provides an advantage over the embodiments discussed above. In particular, because the line sensors are positioned as herein described and shown, the physical space around sub-units 110B and 110C increases which allows easy adjustments to be performed. Moreover, the structure depicted in FIG. 12 allows for squint and pupil exit adjustments to be performed in manners similar to those described with regard to the third embodiment discussed above. Finally, it should be noted that by making the optical system of one area integral with the main unit, the sub-units can be positioned away from the main unit to thereby reduce the work necessary to perform pupil exit adjustments.

It should be understood that the present invention allows a portion of the luminous flux to be reflected by a mirror, as described for the second embodiment, while not reflecting the entire, or remaining, luminous flux.

The present invention, as exemplified by the foregoing discussions of the four preferred embodiments, allows for squint and pupil exit adjustments to be performed independently for each focus detection range or area in a focus detection apparatus that has multiple focus detection ranges or areas. As such, the present invention enables precise, equal, focus detection accuracy for all multiple focus detection ranges or areas, as well as facilitating squint and pupil exit adjustments in an easy way.

Although preferred embodiments of the present invention have been shown and described, it will be appreciated by those skilled in the art that many changes may be made in these embodiments, without departing from the principles, teachings, and spirit of the present invention, the scope of which is defined in the appended claims and their equivalents.

What is claimed is:

1. A focus detection apparatus for detecting focus points for at least two areas of a field of view, the apparatus adaptable to be used with a camera having a lens for taking in light, said focus detection apparatus comprising:

at least two field lenses positioned near an imaging plane of said lens, said at least two field lenses being used to condense the light flux corresponding to said at least two areas;

at least two pairs of reimaging lenses, each pair of said at least two pairs of reimaging lenses separately receiving the light coming through each field lens of said at least two field lenses in such a manner that the light flux corresponding to the at least two areas forms a pair of subject images for each area;

at least two pairs of aperture masks that are positioned near each pair of reimaging lenses to regulate the light coming through each pair of reimaging lenses of said at least two pairs of reimaging lenses; and at least two pairs of photosensors that are positioned near a secondary imaging plane of said lens, each pair of photosensors of said at least two pairs of photosensors receiving said pair of subject images formed from light coming through each pair of reimaging lenses of said at least two pairs of reimaging lenses;

a primary unit for housing said at least two field lenses;

a secondary unit for housing a first pair of reimaging lenses of said at least two pairs of reimaging lenses and a first pair of aperture masks of said at least two pairs of aperture masks, said first pair of reimaging lenses and said first pair of aperture masks corresponding to a first focus detection area; and a third unit for housing a second pair of reimaging lenses of said at least two pairs of reimaging lenses and a second pair of aperture masks of said at least two pairs of aperture masks, said second pair of reimaging lenses and said second pair of aperture masks corresponding to a second focus detection area.

2. The focus detection apparatus according to claim 1, wherein a first pair of photosensors corresponding to a first area of said at least two areas is aligned independently of said secondary unit and is configured to be fixed in place, and wherein a second pair of photosensors corresponding to a second area of said at least two areas is aligned independently of said third unit and is configured to be fixed in place, and wherein said secondary unit and said third unit are configured to be aligned independently of said first unit and are configured to be fixed in placed.

3. A focus detection apparatus for detecting focus points for at least two areas of a field of view, the apparatus adaptable to be used with a camera having a lens for taking in light, said focus detection apparatus comprising:

at least two field lenses positioned near an imaging plane of said lens, said at least two field lenses being used to condense the light flux corresponding to said at least two areas;

at least two pairs of reimaging lenses, each pair of said at least two pairs of reimaging lenses separately receiving the light coming through each field lens of said at least two field lenses in such a manner that the light flux corresponding to the at least two areas forms a pair of subject images for each area;

at least two pairs of aperture masks that are positioned near each pair of reimaging lenses to regulate the light coming through each pair of reimaging lenses of said at least two pairs of reimaging lenses; and at least two pairs of photosensors that are positioned near a secondary imaging plane of said lens, each pair of photosensors of said at least two pairs of photosensors receiving said pair of subject images formed from light coming through each pair of reimaging lenses of said at least two pairs of reimaging lenses;

a primary unit housing said at least two field lenses and a first pair of reimaging lenses of said at least two pair of reimaging lenses and a first pair of aperture masks of said at least two pairs of aperture masks, said first pair of reimaging lenses and said first pair of aperture masks corresponding to a first area of the at least two areas; and a secondary unit housing a second pair of reimaging lenses of said at least two pair of reimaging lenses and a second pair of aperture masks of said at least two pair of aperture masks, said second pair of reimaging lenses and said second pair of aperture masks corresponding to a second area of said at least two areas.

4. The focus detection apparatus according to claim 3, wherein a first pair of photosensors of said at least two pair of photosensors corresponding to a first area of said at least two areas is configured to be aligned independently of said primary unit and fixed in place, and wherein a second pair of photosensors of said at least two pair of photosensors corresponding to a second area of said at least two areas is configured to be aligned independently of said secondary unit and fixed in place, and wherein said secondary unit is configured to be aligned independently of said primary unit and fixed in place.

5. A focus detection apparatus according to claim 1, further comprising a mirror, said mirror reflecting light corresponding to an area of said at least two areas.

6. A focus detection apparatus according to claim 3, further comprising a mirror, said mirror reflecting light corresponding to an area of said at least two areas.

* * * * *